Figure 33:
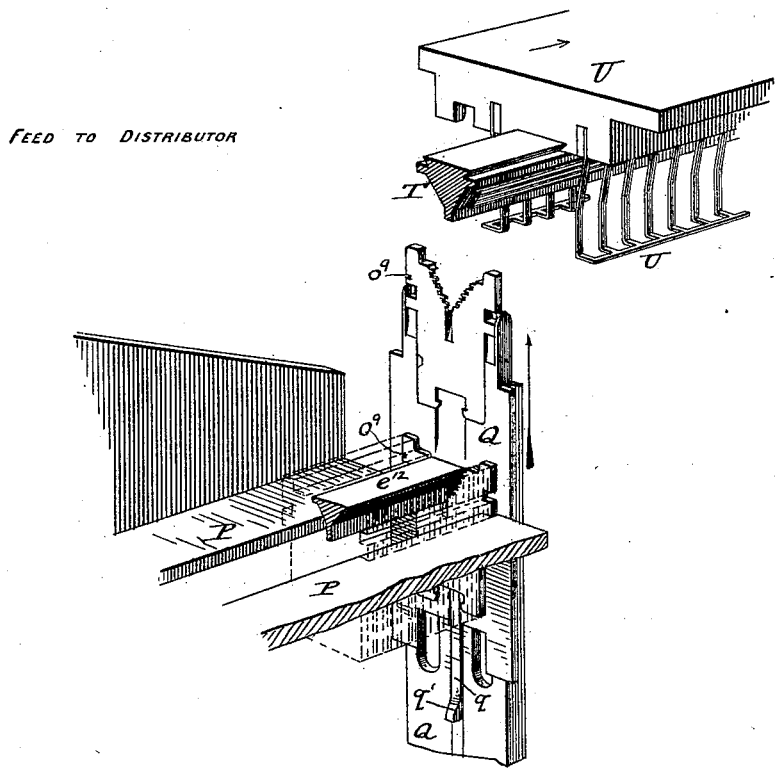

(No Model.) 15 Sheets—Sheet 1.
O. MERGENTHALER.
MACHINE FOR PRODUCING TYPE BARS.
No. 425,140. Patented Apr. 8, 1890.
Fig. 1ᵃ
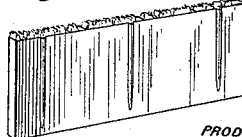
PRODUCT OF MACHINE.
Fig. 1ᵇ
Fig. 1.
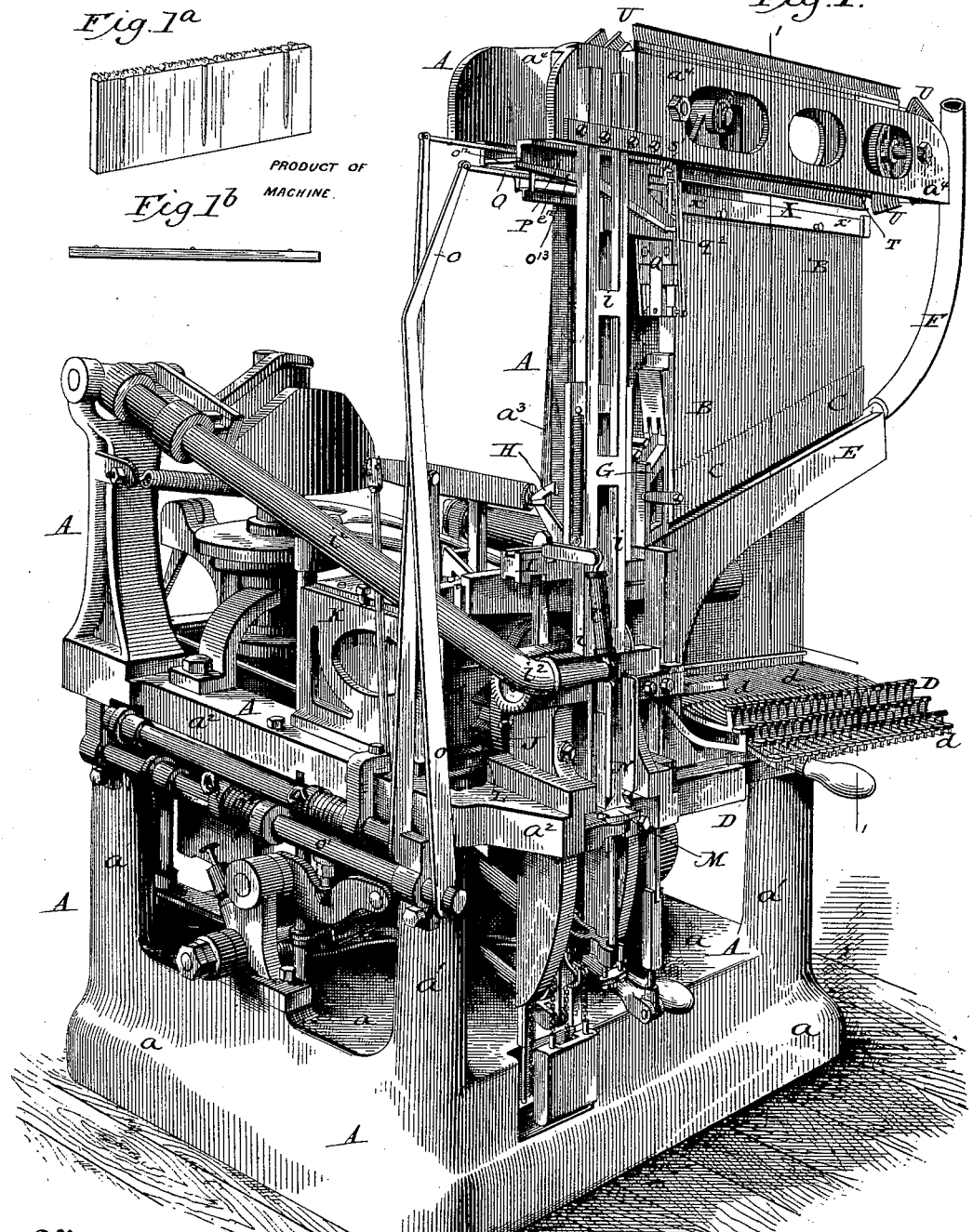
Witnesses
James F. DuHamel
W. R. Kennedy
Inventor
Ottmar Mergenthaler
By his Attorney
Phil. T. Dodge.

(No Model.) 15 Sheets—Sheet 2.
O. MERGENTHALER.
MACHINE FOR PRODUCING TYPE BARS.
No. 425,140. Patented Apr. 8, 1890.
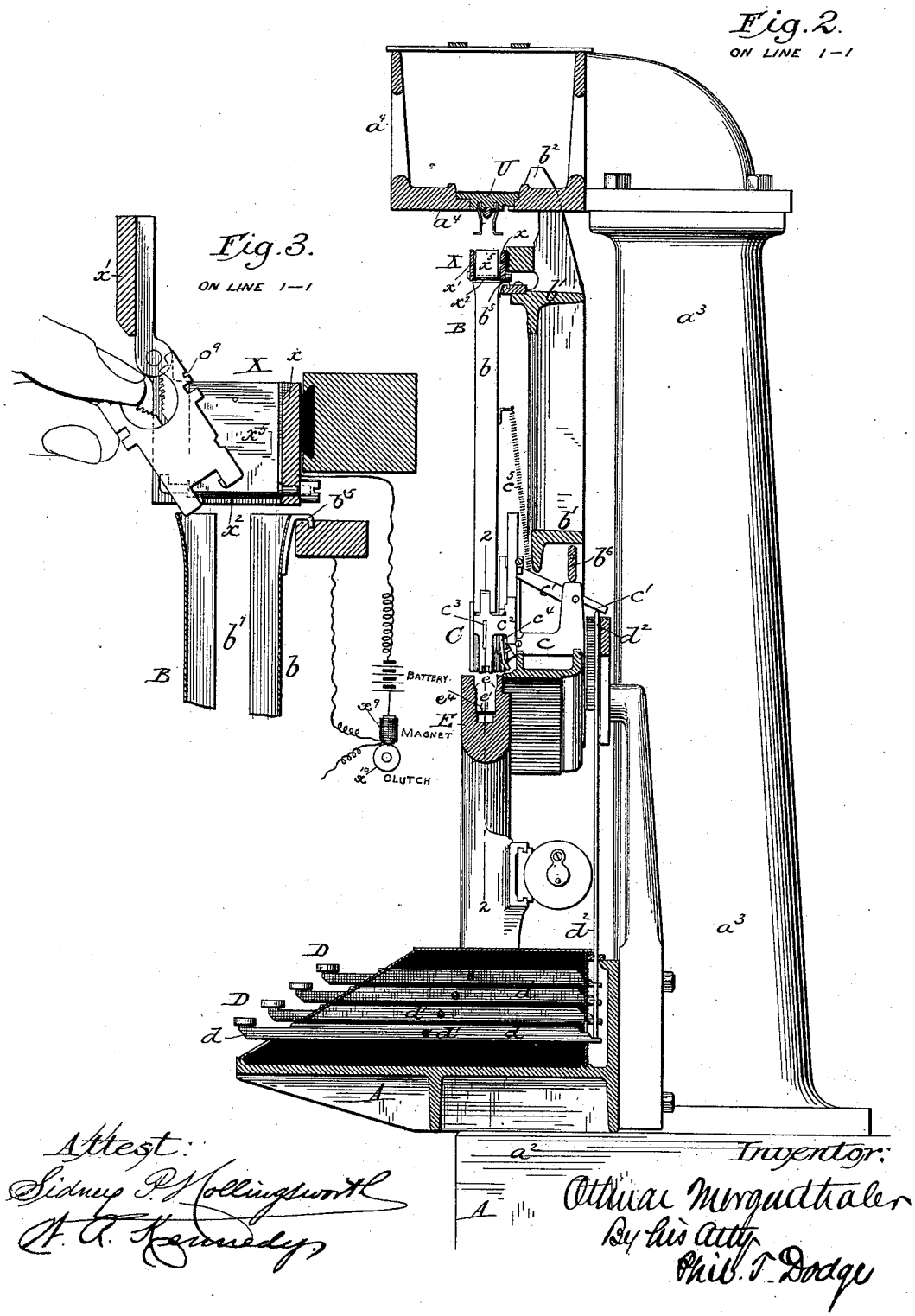

(No Model.) 15 Sheets—Sheet 3.
O. MERGENTHALER.
MACHINE FOR PRODUCING TYPE BARS.
No. 425,140. Patented Apr. 8, 1890.
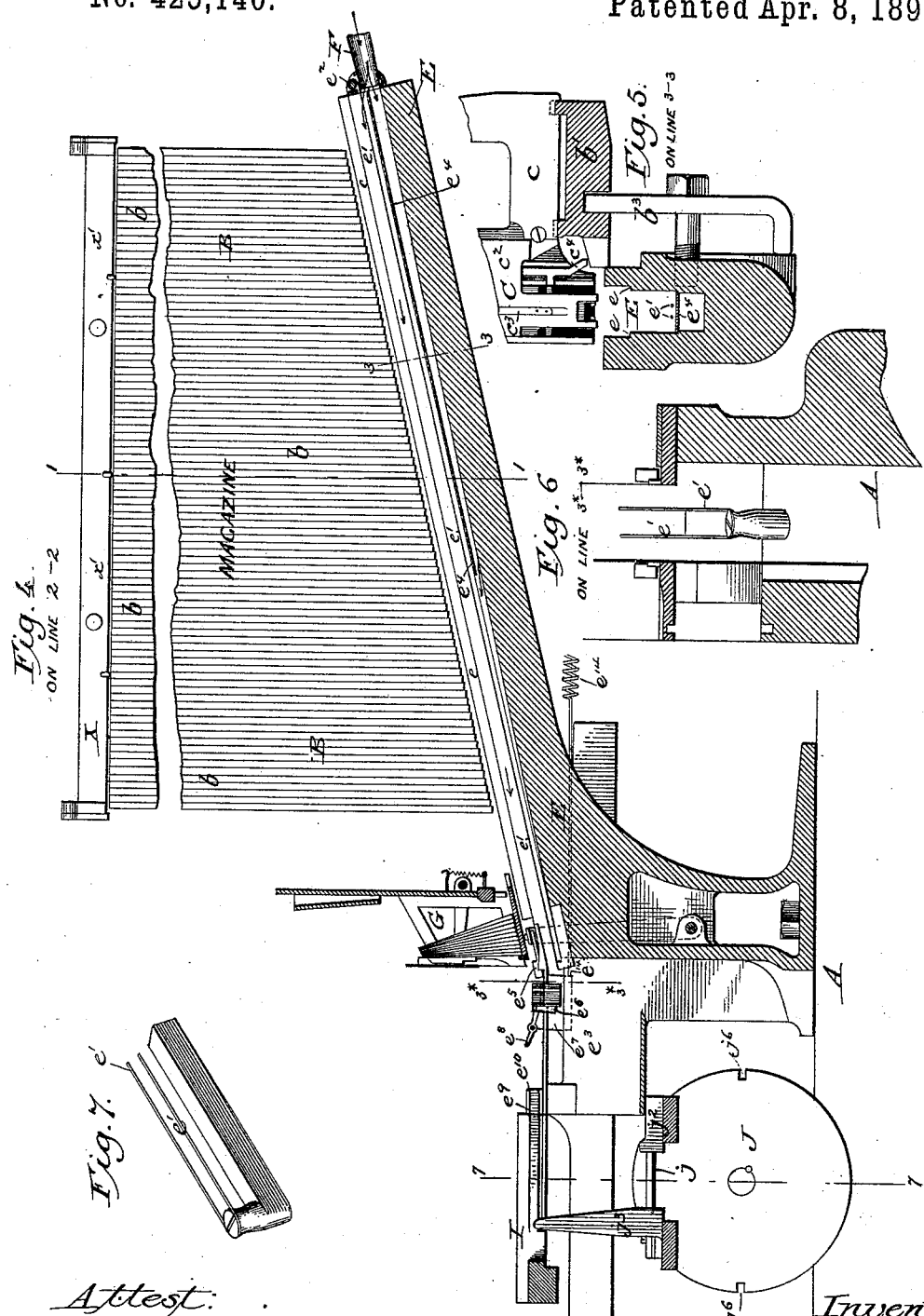

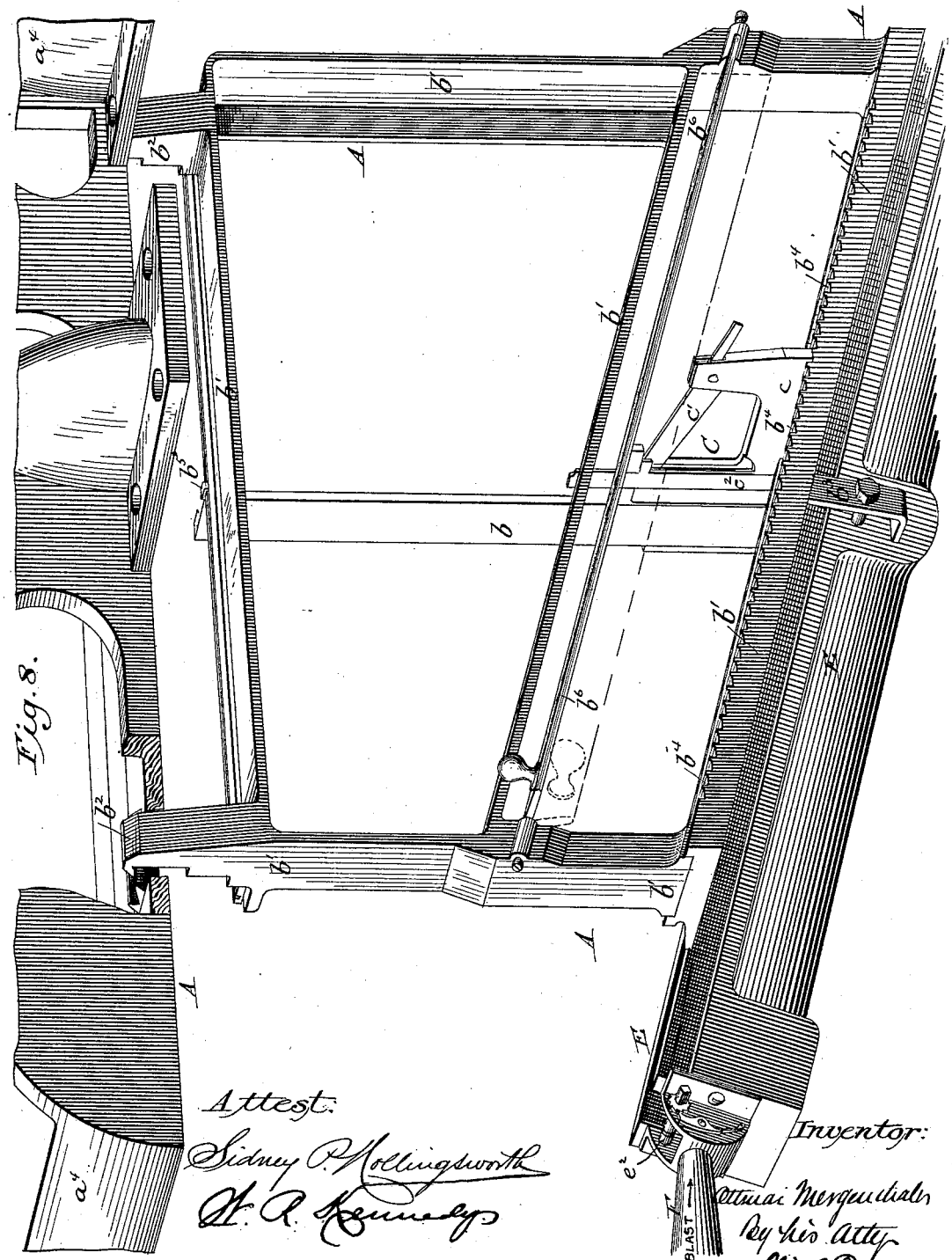

(No Model.) 15 Sheets—Sheet 5.
O. MERGENTHALER.
MACHINE FOR PRODUCING TYPE BARS.
No. 425,140. Patented Apr. 8, 1890.
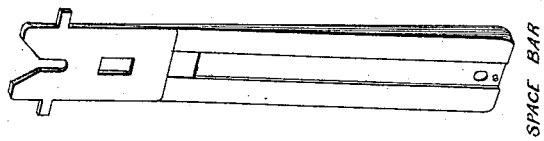
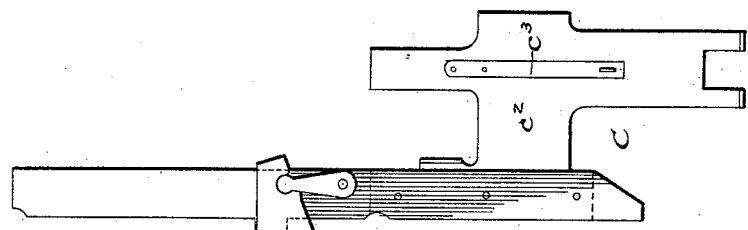
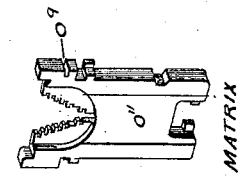
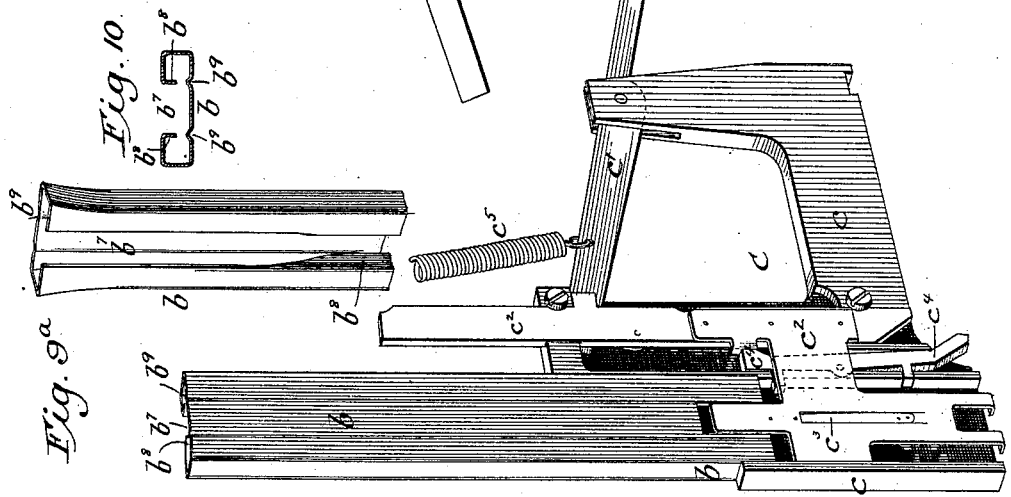
Attest: Inventor:

(No Model.) 15 Sheets—Sheet 6.
O. MERGENTHALER.
MACHINE FOR PRODUCING TYPE BARS.
No. 425,140. Patented Apr. 8, 1890.
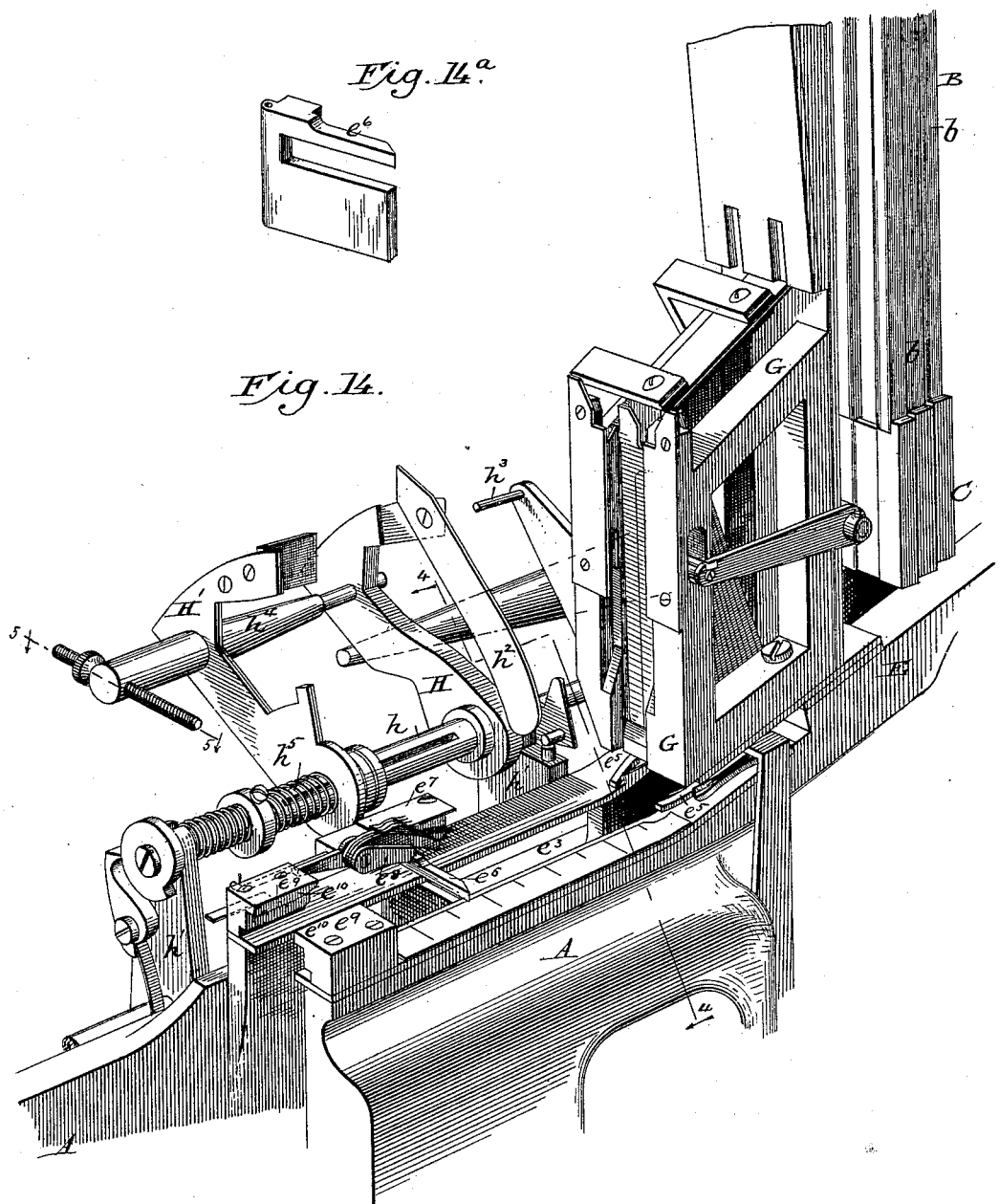
Attest:
Sidney P. Hollingsworth
W. R. Kennedy
Inventor:
Ottmar Mergenthaler
By his Atty
Phil. T. Dodge
THE NORRIS PETERS CO., PHOTO-LITHO., WASHINGTON, D. C.

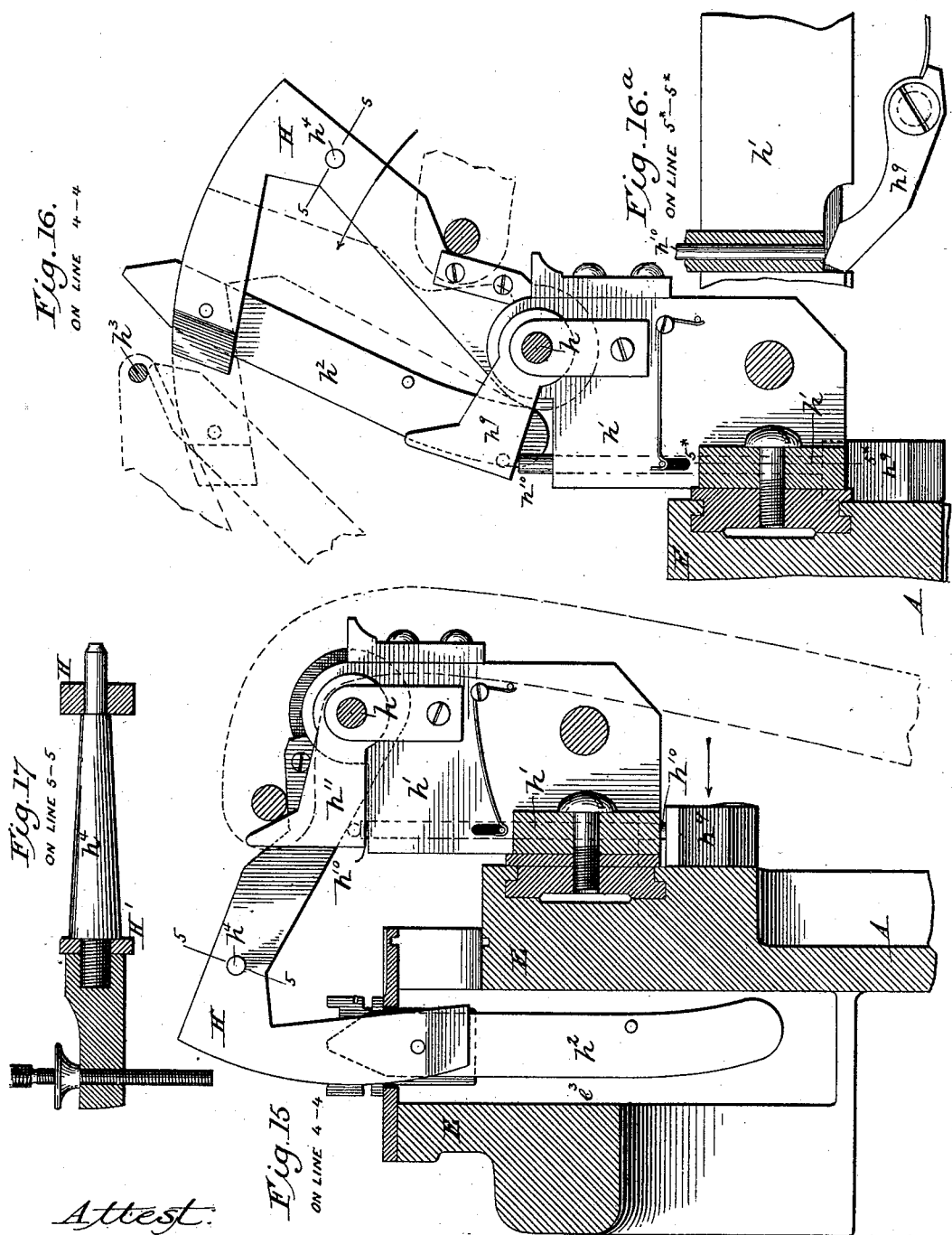

(No Model.) 15 Sheets—Sheet 8.
O. MERGENTHALER.
MACHINE FOR PRODUCING TYPE BARS.
No. 425,140. Patented Apr. 8, 1890.
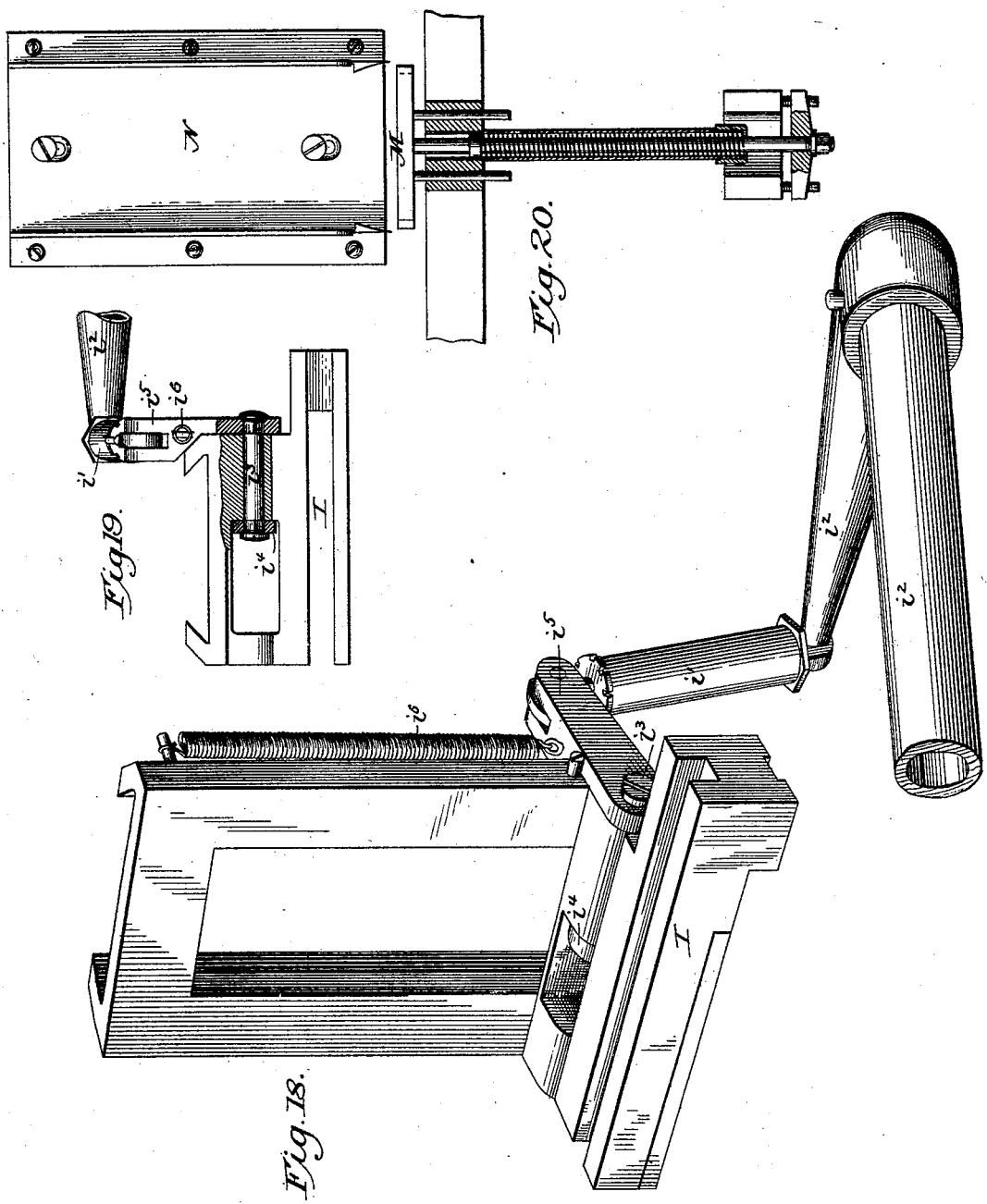
Attest:
Sidney P. Hollingsworth
N. R. Kennedy
Inventor:
Ottmar Mergenthaler
By his Atty
Phil T. Dodge (No Model.) 15 Sheets—Sheet 9.
O. MERGENTHALER.
MACHINE FOR PRODUCING TYPE BARS.
No. 425,140. Patented Apr. 8, 1890.
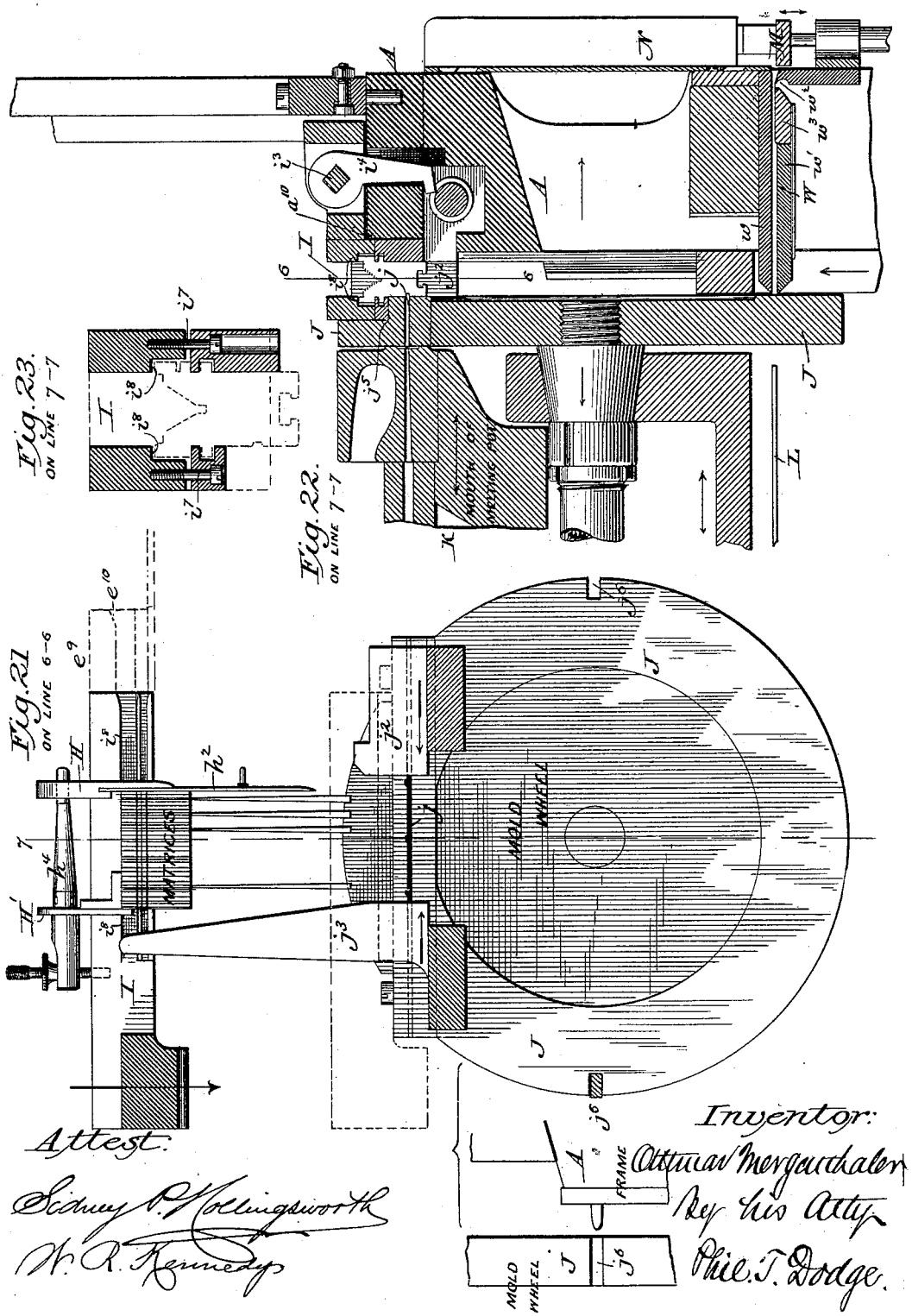

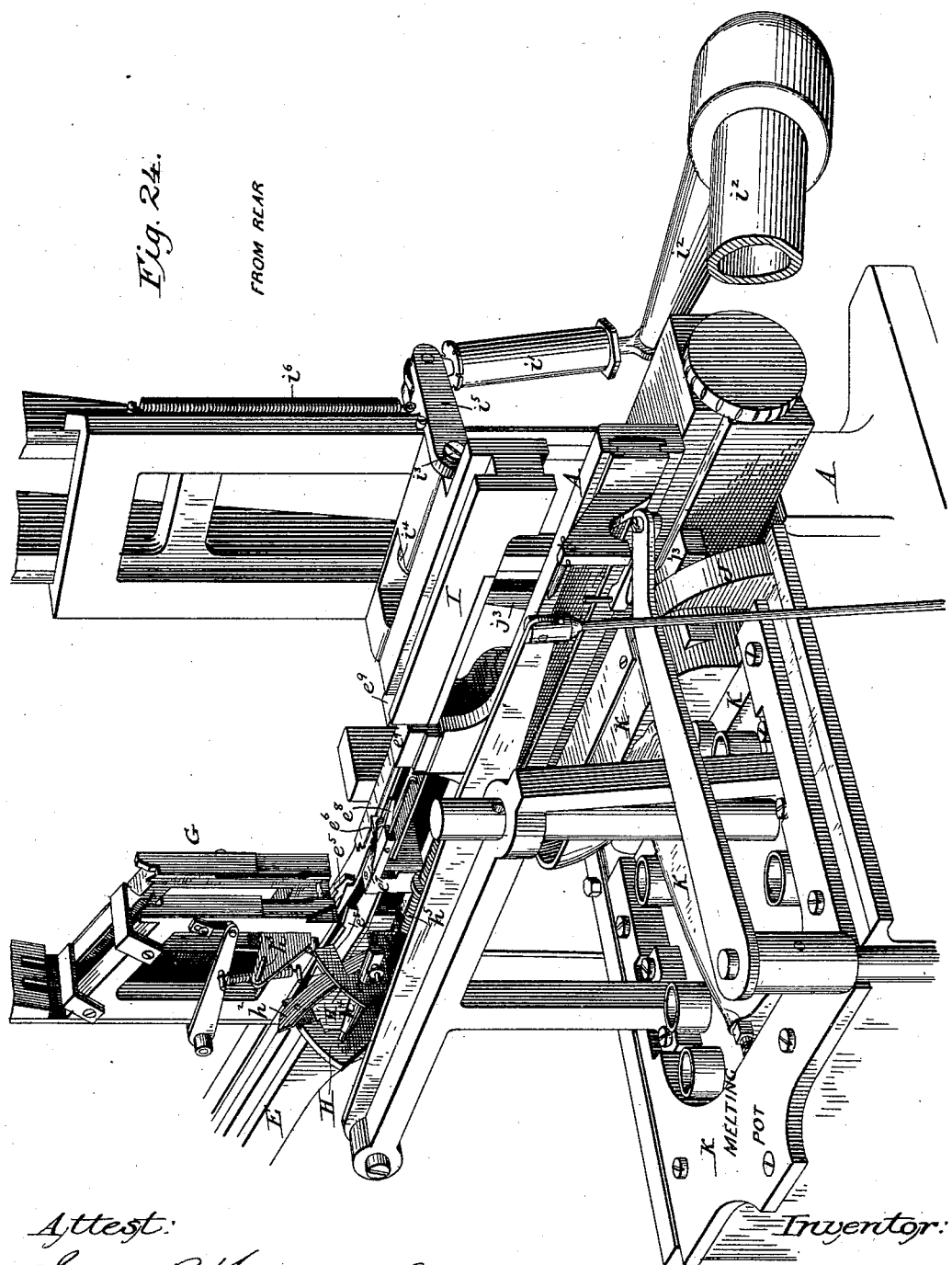

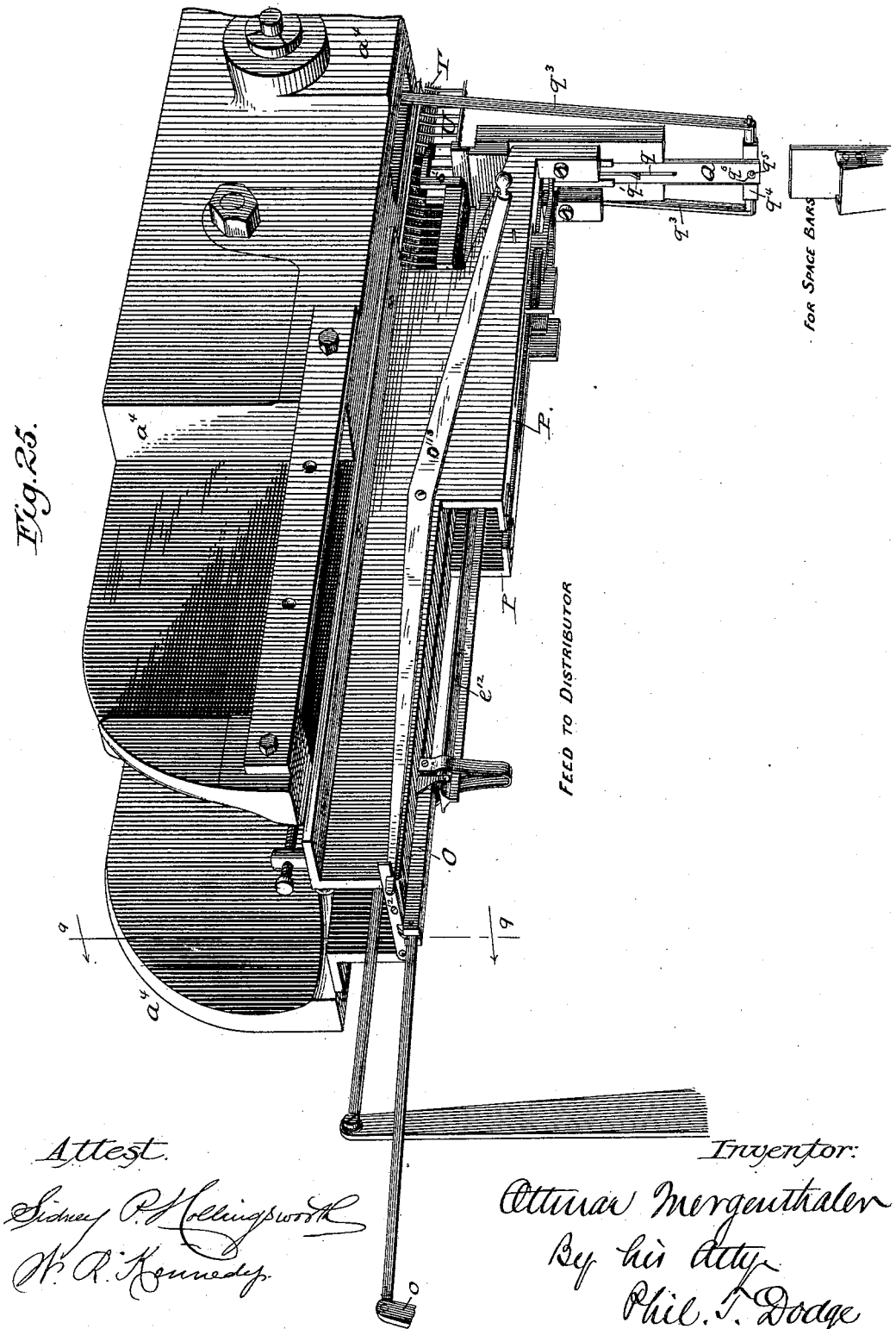

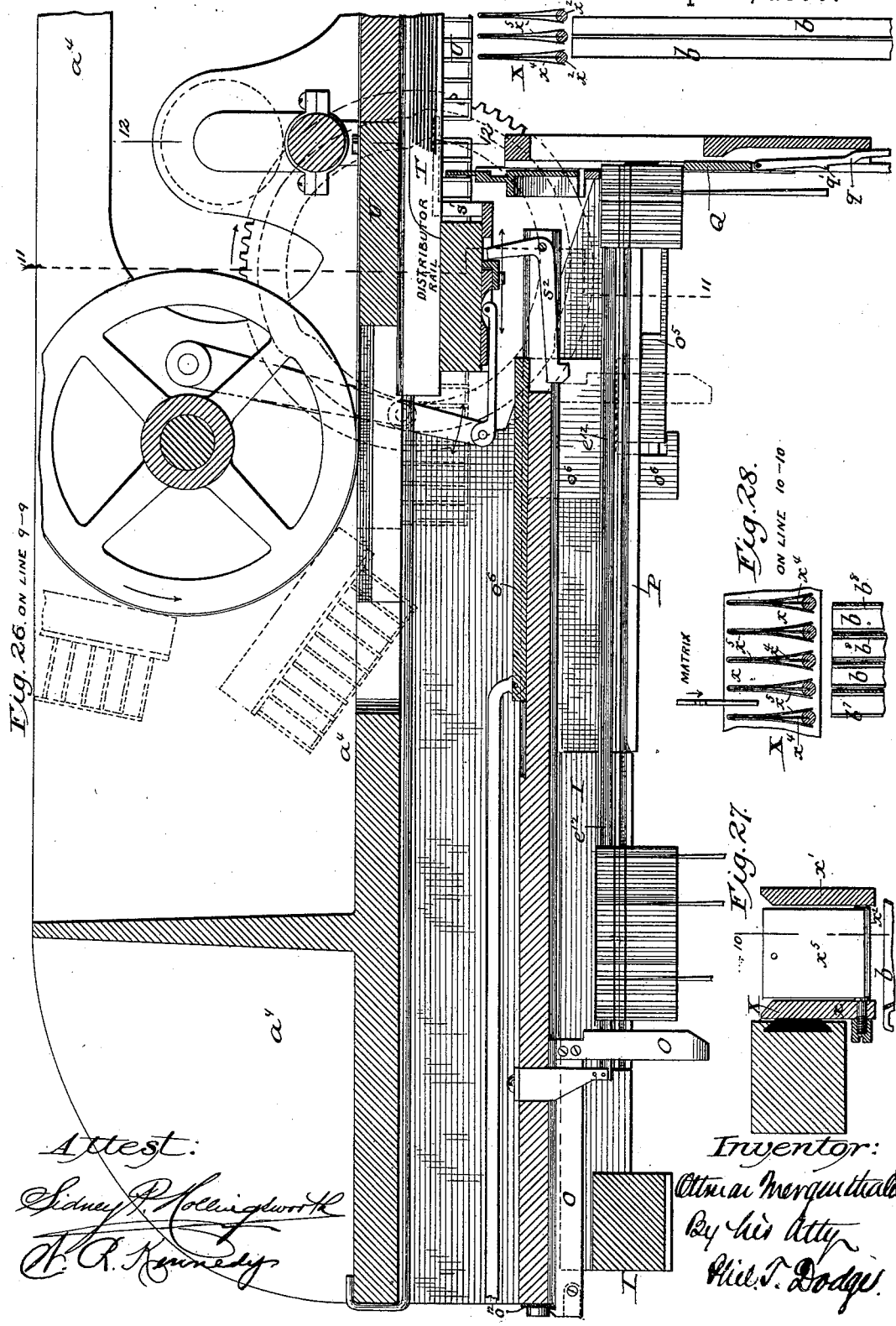

(No Model.) 15 Sheets—Sheet 13.
O. MERGENTHALER.
MACHINE FOR PRODUCING TYPE BARS.
No. 425,140. Patented Apr. 8, 1890.
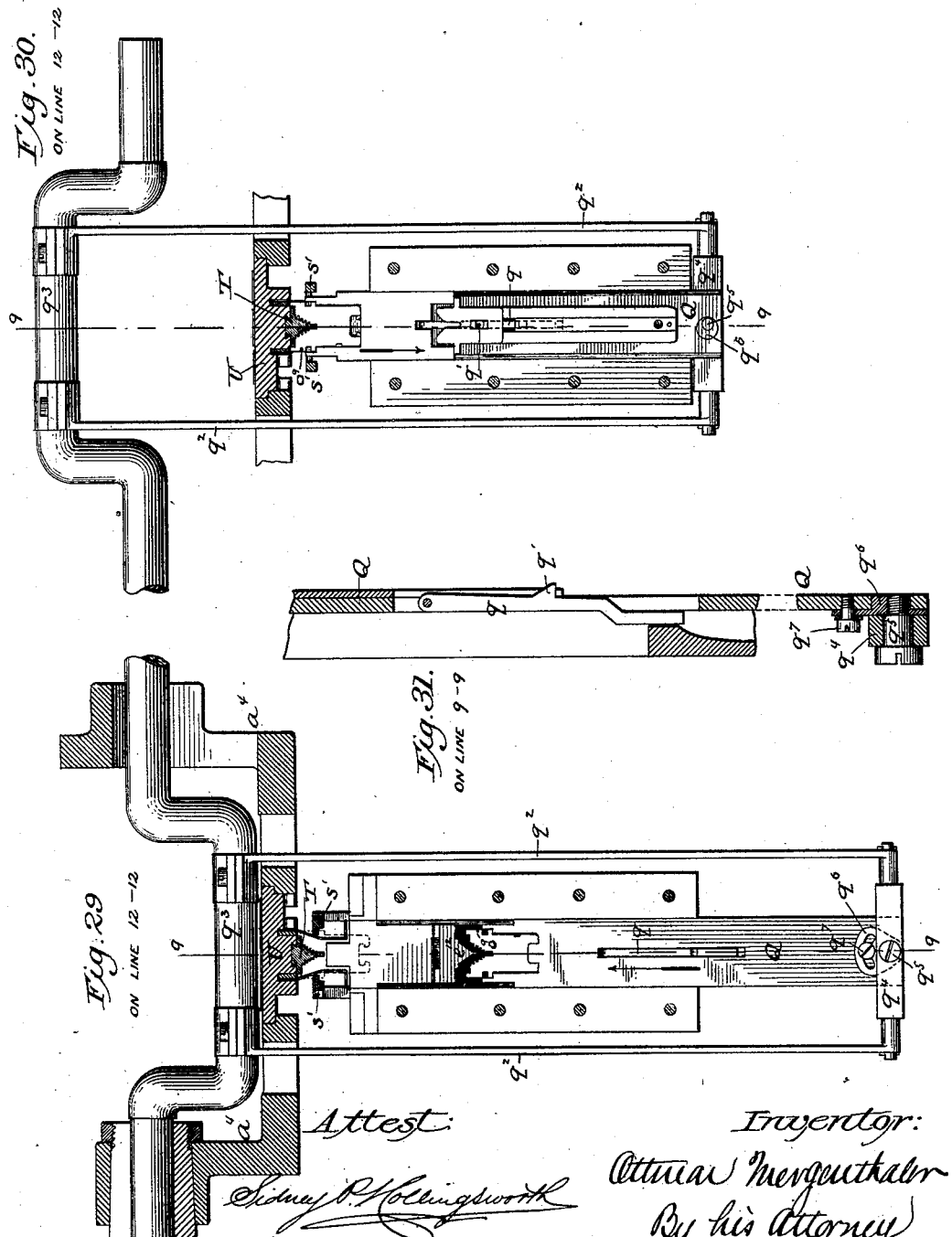

(No Model.) 15 Sheets—Sheet 14.
O. MERGENTHALER.
MACHINE FOR PRODUCING TYPE BARS.
No. 425,140. Patented Apr. 8, 1890.
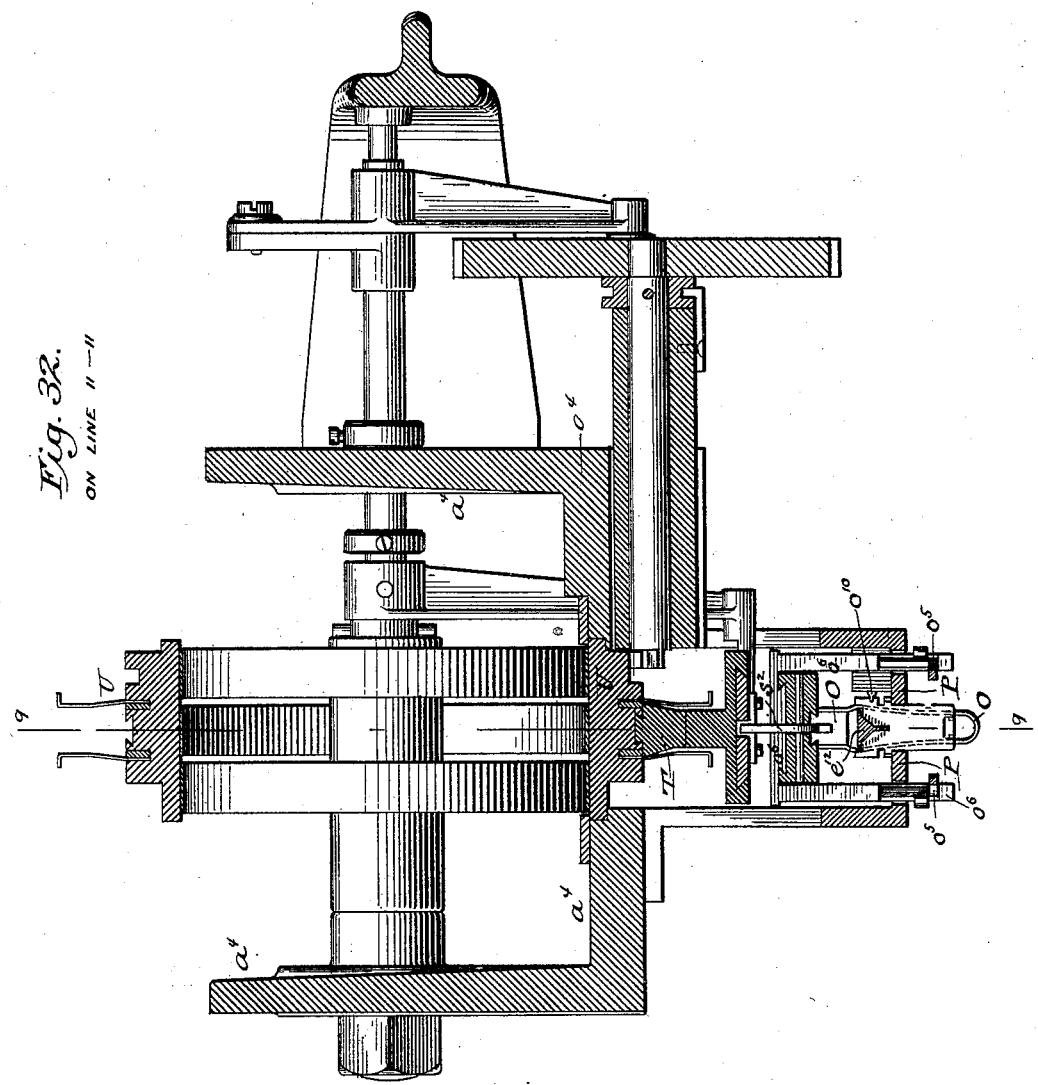

(No Model.) 15 Sheets—Sheet 15.
O. MERGENTHALER.
MACHINE FOR PRODUCING TYPE BARS.
No. 425,140. Patented Apr. 8, 1890.

UNITED STATES PATENT OFFICE.

OTTMAR MERGENTHALER, OF BALTIMORE, MARYLAND, ASSIGNOR TO THE NATIONAL TYPOGRAPHIC COMPANY, OF WEST VIRGINIA.

MACHINE FOR PRODUCING TYPE-BARS.

SPECIFICATION forming part of Letters Patent No. 425,140, dated April 8, 1890.

Application filed January 19, 1888. Serial No. 261,210. (No model.)

*To all whom it may concern:*

Be it known that I, OTTMAR MERGENTHALER, of Baltimore, in the State of Maryland, have invented certain Improvements in Machines for Forming Type-Bars, Matrices, &c., of which the following is a specification.

The present invention has reference to that class of machines originated by myself and now known in the art as "linotype-machines," designed to produce and assemble metal bars commonly termed "linotypes," each bearing on one edge, properly justified, the type-characters to print a complete line.

The invention is based upon and relates to various improvements in the machines heretofore invented by me and represented more particularly in Letters Patent of the United States No. 317,828, dated May 12, 1885, and Nos. 347,629 and 347,630, dated August 17, 1886.

The improvements have reference more particularly to the details of the magazine in which the matrices are contained; the channel and blast mechanisms for advancing and assembling the matrices after their discharge from the magazine-tubes; the mechanism for transferring the assembled or composed line to the casting mechanism; the devices for aligning and confining the matrices in front of and against the mold; the mechanism for transferring the matrices after the casting operation to the distributer, and to various details of the distributing mechanism.

Referring to the accompanying drawings, Figure 1 is a perspective view of the entire machine, as seen from the front. Figs. 1ª and 1ᵇ are respectively a perspective and a bottom plan view of one of the type-bars or linotypes, the product of the machine. Fig. 2 is a vertical section through the magazine, distributer, and composing mechanism from front to rear on the line 1 1 of Figs. 1 and 4. Fig. 3 is a sectional view on the same line through the upper part of the magazine, on an enlarged scale. Fig. 4 is a longitudinal section on the line 2 2 of Fig. 2, showing particularly the conductor or channel for the matrix and the devices for dividing the blast. Fig. 5 is a vertical cross-section on the line 3 3 of the preceding figure. Fig. 6 is a vertical cross-section on the line 3* 3* of the preceding figure. Fig. 7 is a perspective view showing the manner of supporting the lower end of the wires which retain the matrices in the conductor-channel. Fig. 8 is a perspective view from the rear side showing the removable frame which supports the magazine-tubes and its connections with the distributer-frame at the top and the matrix guide or conductor at the bottom, a single magazine-tube and its ejecting device being shown in position. Fig. 9 is a perspective view of the lower end of one of the magazine-tubes and the matrix-ejecting devices attached thereto, and Fig. 9ª a perspective view of its upper end. Fig. 10 is a horizontal cross-section of one of the magazine-tubes. Fig. 11 is a side elevation showing the ejector-slide and its actuating-lever. Figs. 12 and 13 are perspective views showing, respectively, one of the matrices and one of the expansible space-bars. Fig. 14 is a perspective view showing the lower end of the matrix-conductor, the devices for assembling the matrices, for delivering the space-bars into the line, and for transferring the completed line of matrices laterally to the devices which present them successively to the casting and distributing mechanisms. Fig. 14ª is a perspective view of the yielding finger or resistant, against which the line of matrices is advanced during its composition. Fig. 15 is a transverse vertical section from front to rear on the line 4 4 of Fig. 14 in the direction indicated by the arrow, showing particularly in operative position the devices which effect the lateral transfer of the completed line of matrices. Fig. 16 is a similar view on the same line, with the transferring devices in their elevated or inactive position. Fig. 16ª is a rear elevation of the devices for releasing the transferring devices that they may move laterally, the view being taken in the direction indicated by the arrow in Fig. 15. Fig. 17 is a cross-section on the line 5 5 of Figs. 14, 15, and 16. Fig. 18 is a perspective view of the vertically-moving slide and its actuating devices, through which the line of matrices is first lowered to the casting mechanism and thereafter lifted to the distributer. Fig. 19 is a top plan view of said slide, a portion being broken away to show the locking-dog by which it is held down during the casting operation. Fig. 20 is a front elevation of the galley and devices for assembling the linotypes therein, the lifting devices being shown partly in section. Fig. 21 is a front elevation, partly in section, on the line 6 6 of Fig. 22, showing the mold-wheel and the devices for transferring the line of matrices thereto. Fig. 22 is a vertical section through the casting and matrix-clamping mechanisms on the line 7 7 of Figs. 4 and 21. Fig. 23 is a vertical cross-section on the line 7 7, showing, on an enlarged scale, the devices which carry the matrices and align them in front of the mold. Fig. 24 is a perspective view showing more particularly the mechanism for composing and transferring the line of matrices, the melting-pot, and the adjacent parts, the view being taken from the rear and in a downward direction. Fig. 25 is a perspective view looking in an upward direction against the receiving end of the distributer, showing particularly the devices by which the matrices are presented one at a time to the distributer-rail and the space-bars delivered in a downward direction to their receptacle. Fig. 26 is a longitudinal vertical central section through the receiving end of the distributer and the devices for introducing the matrices thereto, the section being taken on the line 9 9 of Figs. 25, 29, 30, and 32. Fig. 27 is a vertical cross-section from front to rear through the upper end of one of the magazine-tubes and the mouth-piece thereover. Fig. 28 is a vertical section through the same on the line 10 10. Fig. 29 is a vertical section from front to rear through the distributer on the line 12 12 of Fig. 26, showing in side elevation the vertical slide and attendant parts for delivering the matrices upward to the distributer-rail and the space-bars downward to their receiver, the lifting-slide being shown in the lower position. Fig. 30 is a similar view with the lifting-slide in its elevated position. Fig. 31 is a vertical section, on an enlarged scale, through the lifting-slide on the line 9 9 of Figs. 29 and 30. Fig. 32 is a transverse vertical section through the distributer on the line 11 11 of Fig. 26, showing more particularly the devices for presenting the matrices singly to the distributer-rail. Fig. 33 is a perspective view showing in their proper relations the principal parts for presenting the matrices to the distributer-rail, the frame-work and minor parts being omitted.

In order that the detailed description which is to follow may be the more readily understood, I will first describe the general organization and operation of the machine.

I employ in the present machine, as in its predecessors, a series of matrices or female type, each representing a single letter or character, and a series of expansible space-bars.

Referring to Fig. 1, A represents a rigid frame-work intended to sustain the various operative parts; B, a series of vertical magazine-tubes containing the matrices or type; and C, ejecting devices located at the lower ends of the magazines and operated by suitable connections from finger-keys D, whereby they are caused to deliver the matrices one at a time from the lower ends of the magazine-tubes into the upper open side of an inclined conductor or trough E. A pipe F, connected with a suitable blower, delivers a blast of air longitudinally through the conductor E from its upper end, this blast serving to carry the matrices forward to the point of assemblage or composition in the lower horizontal end of the conductor E. A receptacle G, containing the series of space-bars, is located above the conductor E and provided with devices connected with a finger-key for delivering the space-bars one at a time downward into the line of matrices in the course of its composition. A pair of vertically and laterally movable arms, one of which is shown at H, serve to transfer the completed line to a vertically-movable yoke or rail I, by which the line is lowered to the face of a mold-wheel J lying in front of a melting-pot K, from which molten metal is delivered into the mold and against the line of matrices. The type-bar or linotype thus produced in the mold is presented by the revolution of the wheel to an ejector-slide L, by which the bar is driven from the mold and carried forward to a lifting-plate M, which in turn delivers the bars successively to the lower end of the galley N. After the matrices have formed the type on the bar cast against them they are carried by the lifting-yoke I to the top of the machine and moved laterally therefrom by a slide O, between horizontal rails P, to a vertical slide Q, which, assisted by other devices, presents the matrices one at a time to the horizontal distributing-rail T, along which they are moved by the endless carrier U until they drop into the upper ends of the appropriate tubes, the space-bars being in the meantime delivered downward by the slide Q to their receptacle G.

It will be perceived that the object of the mechanism is to assemble the matrices and space-bars and present them to the mold, deliver the molten metal against them, and, finally, return them to the magazines from which they started.

In its general organization and in all its leading features the present machine is substantially identical with that represented in Patent No. 378,798, to which reference may be made for a detailed description of such parts as are not specifically described herein.

I will now describe the construction of the present machine in detail, more especially with reference to the features constituting the subjects of the present invention.

Referring to Fig. 1, A represents the rigid main frame consisting of a base plate $a$, having at its four corners posts or pillars $a'$, supporting a horizontal bed or table $a^2$, which in turn supports two uprights $a^3$, carrying at their upper ends the horizontal distributer-frame $a^4$.

B represents the magazine composed of a series of vertical tubes $b$, arranged side by side and connected, as shown in Fig. 8, to a rigid frame $b'$. This frame is provided at its top with two hooked arms $b^2$, by which it is suspended from the stationary distributer-frame $a^4$, this connection allowing the entire magazine to be readily removed from the main frame independently of the key mechanism, to the end that it may be replaced by a magazine containing matrices adapted to produce a different style or size of type. At its lower end the magazine-frame $b'$ bears against the rear side of the conductor E, and is held in place by a clip-plate $b^3$ and a fastening-bolt therethrough. This clip is not an essential feature and may be replaced by any other suitable fastening.

The magazine-tubes $b$ are attached independently to the frame $b'$, so that any tube requiring examination or repairs may be removed by lifting it out in a forward direction—that is to say, in an edgewise direction toward the operator—without disturbing the remainder. The mode of attachment to this end is plainly represented in Figs. 2 and 8, from which it will be seen that the bottom of the frame $b'$ is provided with a series of transverse grooves $b^4$ to receive the lower end of the tube, and the tube provided at its top with a hook $b^5$, adapted to engage a lip on the top of the frame $b'$. This construction holds the tubes in the exact position required, but admits of their being lifted from the front of the frame at will.

A bar $b^6$, (see Figs. 2 and 8,) pivoted at its ends in the frame $b'$, extends across the rear side of the magazine, and when free it drops downward and bears on plates attached to and forming in effect a part of the lower ends of the tubes in such manner as to prevent them from being lifted out of connection with the frame. When the bar is turned upward, however, it releases the entire series of tubes, so that any one may be removed and replaced at will. It is to be noted that the tubes are not lifted endwise from their positions, but that, on the contrary, they are disengaged by a very slight vertical movement, after which they are removed horizontally. This independent removability of the tubes I consider an important feature of my invention.

Heretofore the magazine-tubes have been of an unbroken tubular form—that is to say, without side openings or channels. I now construct them of the sectional form represented in Figs. 9 and 10, a sheet of metal, forming one side of the flat tube, being bent inward or returned upon itself along its two edges in such manner as to produce a tube having one side closed, but the opposite side open centrally through its entire or substantially its entire length. This side opening $b^7$ is advantageous, in that it permits the escape of the air from the path of the descending matrices, and in that it affords ready access to the interior of the tube at all points in its length, so that a matrix lodging accidentally therein may be readily removed or adjusted. I prefer to construct the tube with the edges of the sheet projected inwardly in the form of ribs or flanges $b^8$, and also provide the opposite or closed side of the tube with inwardly-projected ribs $b^9$. By this construction the matrices are held out of contact with the inner faces of the tubes, thus reducing the friction, preventing the confinement of the air below them, and preventing them from adhering to the side walls in the event of the condensation of moisture thereon.

A further advantage arising from the construction of the tube with the open side lies in the fact that tubes of a uniform size externally may be readily adapted to receive matrices of different thicknesses by turning the edges $b^8$ inward to a greater or less extent, the cost of manufacture in quantity being much less than that of solid drawn tubes of different sizes. The upper end of the tube is enlarged, and the flanges $b^8$ and ribs $b^9$ terminate below the enlarged end to facilitate the admission of the matrices.

At its lower end each matrix-tube is provided with an ejecting mechanism for delivering the matrices in a downward direction therefrom one at a time into the conductor below. This ejecting mechanism C (see Figs. 2, 9, and 11) is substantially identical with that represented in Letters Patent No. 392,446, dated November 6, 1888, and is not claimed in itself as a part of the present invention.

The ejector, which is secured to and is removable with its connecting-tube, consists, mainly, of an arm or plate $c$, fixed rigidly to and forming in effect a part of the tube, a lever $c'$, pivoted to this plate, and a vertically-moving slide $c^2$, operated by the lever. The slide carries a spring-finger $c^3$, by which the matrices are thrust downward, and operates a pivoted detent $c^4$, by which the escape of more than one matrix at a time is prevented. A spring $c^5$ serves to lift the slide and hold it normally in an elevated position. Whenever the rear end of the lever $c'$ is raised, it depresses the slide and the matrix is delivered.

The finger-key mechanism D consists, as shown in Figs. 1 and 2, of a series of key-levers $d$, representing the respective letters or characters, each mounted midway of its lengh on a horizontal pivot $d'$, and arranged to act at its rear end on a vertical rod $d^2$. The key-pivots and the rods $d^2$ are sustained by suitable supports on the bed-plate of the main frame, the upper ends of the rods bearing beneath the rear ends of the ejector-levers $c'$. The rods, being suitably guided and held in position at their upper ends, are certain to register with the levers, so that the magazine may be removed and replaced with certainty that the rods and levers will assume their operative relations.

The matrix conductor or channel E is made, as in my prior machines, of a U form in cross-section, with its open sides immediately under the magazine-tubes, in order that it may receive the matrices therefrom. The conductor is formed internally with the longitudinal ribs or shoulders $e$, upon which the shoulders at the upper ends of the matrices rest, for the purpose of retaining the matrices in an upright position as they are carried lengthwise through the conductor by the force of the blast. To prevent the matrices from being overturned, I stretch longitudinally in the lower part of the channel two wires $e'$, which engage shoulders on the lower ends of the matrices, as in Patent No. 378,798. At their upper ends these wires are connected to a winding-spindle $e^2$, Fig. 8, by which their proper tension may be maintained, and at the lower end are extended downward beyond the point at which they terminate in my previous machine and until they overlie the horizontal terminal portion of the guide E, on which the matrices are assembled. By thus extending the wires so that they hold the matrices down until their direction of movement is changed and they have commenced to travel horizontally I avoid the danger of the light matrices being overturned or being blown out of the machine. At its lower end the conductor E terminates, as in my previous applications, in the horizontal portion $e^3$, having the side walls to support and sustain the line of matrices, but open on the under side that they may be relieved from the lifting effect of the blast.

Instead of delivering the entire blast directly into the upper end of the matrix-channel of the conductor E and against the matrices delivered from the upper tubes, as in the previous machines, I now provide means for dividing the blast, allowing one portion to enter the upper end of the conductor and the remaining portion to enter the conductor at a lower point. By thus distributing or dividing the blast and introducing the secondary or unweakened blast midway of the length of the conductor or thereabout I am enabled to carry all the matrices forward to the point of assemblage with rapidity and certainty, and this without employing a blast so strong as to cause the matrices to strike violently upon each other, or to cause the throwing of the light matrices from the machine. The pipes or passages for delivering the blast into the channel or passage of the conductor at different points in its length may be constructed in any appropriate manner. I have found it a good practice to make the channel at its upper end deeper than would otherwise be required and to introduce therein one or more horizontal partitions $e^4$, extending from the upper end downward half the length of the conductor or thereabout. The blast-pipe F delivers the air partly above and partly below this partition. The upper portion of the blast passes over the partition $e^4$ the entire length of the conductor, while the portion passing beneath the partition is inoperative, and is prevented from acting on the matrices until it emerges at the lower end of the partition. While I have in practice found that it is sufficient to thus introduce the blast at two points it is manifest that it may be subdivided and introduced at any number of points in the length of the conductor.

At the lower end of the conductor I employ reciprocating dogs $e^5$, to advance the successive matrices against the line beyond them and to prevent them from rebounding. These dogs may be identical with those in Patent No. 378,798.

In order to arrest the descending matrices at the front end of the line, and thus keep the line in compact form, I use, as in my previous machines, a transverse finger or resistant $e^6$, lying across the horizontal portion of the conductor, as in Fig. 14, and connected by a vertical pivot to a horizontally-sliding block $e^7$. The finger is held normally in its operative position by a dog $e^8$, and its supporting-slide is urged constantly toward the descending matrices by a spiral spring $e^{14}$, Fig. 4, these features being the same as in the earlier machines.

From the horizontal end of the conductor the line of matrices is carried laterally into the lifting or transferring yoke I, which stands normally in line with and forms a continuation of the conductor, as shown in Figs. 1, 4, 18, 19, and 21. This elevating-yoke is moved vertically on a stationary guide $i$, so that it may descend with the matrices to the mold, and thereafter ascend with them to the distributer, its motion being effected through a link $i'$, connected to a vertically-vibrating arm $i^2$, as in my older machines.

The transfer of the line of matrices to the lifting-yoke is effected, as in my earlier machines, by two arms H and H', arranged to swing downward into the conductor in such manner as to grasp the line of matrices between them, and then move laterally to carry the line into the lifting-yoke. These arms are mounted, as in Patent No. 378,798, on a horizontal shaft $h$, carried by a block $h'$ sliding horizontally in a groove on the rear side of the conductor E. The devices for moving the slide $h'$ to and fro horizontally and for locking the slide in its normal position are practically identical with those shown in Letters Patent No. 378,798, and form no part of the present invention. With two exceptions the arms H H' may be constructed and operated in the manner set forth in the above-named patent.

The first improvement consists in providing the arm H with a pivoted blade $h^2$, (shown in Figs. 14, 15, and 16,) forming a downward continuation thereof, so constructed and arranged that as the arms swing downward to grasp the matrices this blade will pass downward through the conductor E and past the rear end of the line. It serves, mainly, to bear against and hold the end of the line of matrices from shifting laterally out of position, so that they will be certain to pass the end of the clamping-jaw $j^2$ as they are moved downward by the yoke to the casting mechanism.

The blade $h^2$ may be modified in form and arrangement at will, provided only it is adapted to pass down vertically through the conductor. When made of the particular form shown in the drawings, I mount on the frame a stationary pin $h^3$, which, encountering the upper end of the blade, throws its lower end into the proper position to enter between the walls of the conductor. The second improvement, relating to the transfer-arms H and H', resides in providing one of the arms with a rigid pin $h^4$, extending laterally and adapted to pass at its end freely into a hole in the other arm. The arm H' is movable on its shaft to and from its companion, being acted upon by a spring $h^5$, as in my previous machine, so that the two arms grasp the matrices with a yielding or spring pressure. As the two arms H H' approach, the pin $h^4$, sliding through the arm H, holds the arms together, so that they are compelled to rise and fall in unison. The pin avoids in a measure the strain and wear which would otherwise be thrown upon the sliding connection of the arm H' to its shaft.

The lifting or transferring yoke I is grooved or ribbed internally along its sides to engage the shoulders of the matrices and prevent them from rising therein, as plainly shown in Figs. 4 and 21.

In order to insure the passage of the matrices smoothly and easily into the open end of the yoke, I provide the adjacent end of the conductor E with stationary side blocks $e^9$, having inwardly-projecting lips $e^{10}$, beveled upward at one end. These beveled lips, overriding the ends of the matrices, hold them down snugly to their places, so that after leaving the conductor they are certain to pass properly into the yoke.

The mold-wheel J stands in a vertical position below and behind the lower end of the conductor E, and is provided with the slot or mold proper $j$ through it from one face to the other, as in my prior machines. The yoke I, descending with the line of matrices, presents and sustains them in front of the mold-wheel and in such manner that for the time being they close the front of the mold proper, as plainly shown in Fig. 22. While in this position, the matrices are acted upon laterally—that is to say, from opposite ends of the line—and held tightly together by the two horizontally-movable clamps $j^2$ and $j^3$, as in Patent No. 378,798.

To prevent the matrices at the front of the line from moving horizontally out of position as they descend between the open clamps, the clamp $j^3$ is formed with an upwardly-extending arm, as plainly shown in Figs. 4 and 21. The inner or forward edge of this arm, rising to the level at which the matrices are received into the yoke, acts against the end of the line and guides the descending matrices properly to their places between the two jaws $j^2$ and $j^3$. In this action it co-operates with the before-mentioned blade $h^2$, which stands at the opposite end of the line, as plainly shown in Fig. 21. It will be perceived that during its descent the line is confined at its ends between the blade $h^2$ on the one side and the arm $j^3$ on the other. With this exception the construction and operation of the parts for lowering the matrices are substantially identical with that in Patent No. 378,798.

In order to give the desired results, it is necessary that the matrices shall be presented to the mold with their characters in exact alignment vertically. To this end one important feature of the present invention consists in providing means by which the head or yoke I is locked down firmly and accurately in place during the casting operation. This construction, by which the line of matrices is sustained in front of the mold, is plainly shown in Figs. 18, 19, and 22, in which $i^3$ is a horizontal rock-shaft mounted in the yoke and carrying at one end a hooked arm $i^4$, adapted to interlock with a rigid portion of the frame and hold the head down to its place. At its opposite end the rock-shaft $i^4$ is provided, as in Figs. 18 and 19, with a crank-arm $i^5$, to which the link $i'$ for moving the yoke is connected. The crank-arm $i^5$ is allowed but a limited movement, and is held in an elevated position by a spring $i^6$, whereby its hook $i^4$ is kept normally out of engagement with the frame. As the arm $i^2$ descends, it carries the yoke and matrices downward until the yoke comes to a fixed bearing on the frame and mold-wheel, after which the arm $i^2$, continuing its movement, causes the hook $i^4$ to engage the frame and secure the yoke. When the arm $i^2$ rises, its first effect is to unlock, and its second to lift, the yoke. The essential feature of the improvement in this regard resides in the combination, with the rising-and-falling yoke, of an automatic device for positively locking the same down to its place upon the frame in front of the mold, and it is manifest that the details may be variously modified within the range of mechanical skill without changing, essentially, the mode of action.

As a further means of securing a proper alignment of the matrices, I now divide the yoke I for the first time horizontally, and connect its lower portion, which is grooved to receive the sustaining shoulders of the matrices to the upper portion by screws $i^7$ or equivalent connections, which will admit of the upper portion playing vertically in relation to the lower to a very limited extent. The devices for raising, lowering, and locking down the yoke are connected to the upper portion. When the matrices are received into the yoke, the lower or movable portion, suspended loosely from the upper portion by the screws $i^7$, is in its lower position, as shown in Fig. 23. As the yoke descends, the lower portion, which alone sustains the weight of the matrices, comes to a bearing at one side on the main frame and at the opposite side on the shoulder $j^5$ of the mold, as shown in Fig. 22. By this action the matrices are brought approximately in line; but as the upper or body portion of the yoke continues its downward movement its shoulders $i^8$ (see Fig. 23) bear on the upper ends of the matrices and force them downward firmly to a bearing and into exact alignment vertically. The connecting-link $i'$, through which the yoke receives motion, is of an elastic or yielding character, as in Patent No. 378,798, so that the yoke forces the matrices down to their place with a pressure which is strong, but which is at the same time of a yielding character, so that breakage or injury to the parts is prevented.

In order that the vertical edges of the matrices may be kept in exact alignment, I find it advisable to make the forward side of the yoke I of such vertical depth that it will extend downward on the outer or front edges of the matrices to their lower ends, as shown in Figs. 22 and 23, the matrices being thus supported and held at the front against the inner side of the yoke, instead of being lowered against an anvil or shoulder on the stationary frame, as heretofore. In practice it is found that by thus forming the yoke so that it serves both to suspend the matrices and to directly support them on the outer edge the accuracy of alignment is greatly improved. When in its lower position, the vertical face of the yoke bears against and receives support from the solid vertical face or shoulder $a^{10}$ of the main frame, as seen in Fig. 22.

The mold-wheel is mounted on a horizontally-sliding frame, so that it may be moved to and from the line of matrices, and the melting-pot is in like manner mounted on horizontal guides that its mouth may be moved to and from the rear face of the mold-wheel. These parts, together with the mechanism for moving them, form no part of the present invention, and they may be constructed in the identical manner set forth in Patent No. 378,798. The mechanism for automatically operating the matrix-clamping jaws $j^2$ and $j^3$ may also be constructed in the same manner as that in the application just referred to. At the completion of the casting operation the mold-wheel makes a half-revolution, and the horizontal ejector-slide L, advancing from the rear, passes through the wheel, carrying the linotype before it and through a shaving and sizing mechanism W to the receiving-plate M at the front. The shaving mechanism differs from that shown in Patent No. 378,798 in that it now consists simply of a stationary upper blade $w$ and a stationary lower blade $w'$, the edges of which are presented toward the wheel, and of a second and stationary lower blade $w^2$. Between the blades $w'$ and $w^2$ there is a movable spring-supported plate $w^3$, which serves simply to force the linotypes upward and hold them against the under face of the blade $w$ as they are being carried over the edge of the blade $w^2$. In this way a uniform thickness of the linotype is insured, and the upper secondary blade of the previous machine rendered unnecessary.

As a still further means of bringing the mold proper and the matrices in exact alignment or register, I provide the mold-wheel with one or more notches $j^6$ (see Figs. 4 and 21) and provide the frame with one or more rigid studs adapted to enter these notches as the mold-wheel is moved forward to the casting position. It is preferred to taper the studs, so that they will enter the notches readily and turn the wheel if out of position to the exact point required. Obviously, the studs could be formed upon the wheel and the openings formed in the frame.

To reduce the labor of dressing the linotypes over their entire faces and to admit of the matter being spaced or "leaded" without rendering the bars unduly heavy, I now form the linotypes with two or more narrow ribs across one of their side faces, as plainly shown in Fig. 1. The slot or mold proper of the mold-wheel is formed, as shown in Fig. 21, with grooves in its side wheel to produce these ribs. The ribbed side of the linotype is presented to the under blades of the dressing or shaving mechanism. The ribs and the slots to form them terminate before reaching the back of the mold, so that the ribs act to prevent the linotype from being drawn with the melting-pot from the back of the mold. The linotype having the ribs thereon is not claimed as of the present invention, the same being the subject-matter of application, Serial No. 261,209, filed January 19, 1888. After the casting action is completed and the matrices released by the clamping devices, the lifting-yoke rises until it stands on a level with the stationary rails or flanges P, lying horizontally along the inner sides of the distributer-frame at one end thereof. While the yoke stands in this position the slide O, which was previously retracted, advances and forces the line of matrices out of the yoke and toward the distributing devices, the yoke immediately descending to receive the next line. The slide O is connected with a lever $o$, attached to a rock-shaft $o'$, acted upon by a spring $o^2$, whereby the slide is caused to urge the line of matrices constantly forward, so that the matrix or the space-bar at the front of the line bears against the face of the vertical slide Q. In thus approaching the lifting-slide Q the matrices pass beneath a stationary rail $e^{12}$, which prevents them from rising, except as they pass its end, one at a time.

The foregoing parts, together with the slide Q, which carries the matrices upward and the space-bars downward, are constructed and operated in a manner very similar to that set forth in Patent No. 378,798. At its extreme upper end the slide is recessed in such manner that it will receive a single matrix, and when therefore it descends to its lowest point the foremost matrix is carried forward and seated in the slide, which, moving upward, lifts the matrix until the suspending-teeth in its upper end stand in line with the distributer-rail T. A forked horizontally-reciprocating slide $s'$ engages the edges of the matrix and sustains it momentarily, and while thus sustained one of the toothed plates U of an endless traveling carrier moves the matrix forward until its teeth engage the teeth on the sides of the distributer-rail. The teeth of the rail and the matrices are constructed on the plan set forth in Letters Patent No. 347,629, dated August 17, 1886—that is to say, a matrix bearing a given character differs from matrices bearing other characters either in the number or in the relative arrangement of its teeth, or both, while the longitudinal teeth of the rail change at different points in the length of the rail in such manner that they will engage and support any matrix in the series until it has advanced to a point immediately over its appropriate magazine-tube, when for the first time all of the teeth will disengage, and thus permit the matrix to drop into the tube.

As regards the carrier for advancing the matrices, the vertical slide for lifting them, and the devices for carrying them upon the rail, they are not claimed as of the present invention. The first improvement connected with these parts resides in providing the vertical slide with a pendant finger $q$, pivoted in a slot therein and having a shoulder $q'$. As the slide rises, this finger is without effect upon a matrix at the end of the line, except to prevent its tipping out of its vertical position; but if a space-bar occupies the position at the end of the line the shoulder of the finger $q$ will engage the upper end of the space-bar, as shown in Fig. 30, and as the slide descends the finger will force the space-bar downward and finally permit it to descend to its receptacle G.

The slide Q is reciprocated, as in my previous machine, by connecting-rod $q^2$, carried by a crank-shaft $q^3$. One feature of the present invention consists in the manner of adjusting the slide vertically in relation to the crank and connecting-rods, so that it may be caused to rise to the exact level required for the proper delivery of the matrices to the distributer. This feature is shown in Figs. 29, 30, and 31, in which $q^4$ shows a cross-bar mounted in the connecting-rods and connected at its middle by a pivoted screw $q^5$ to an eccentric $q^6$, which is in turn mounted in the slide and secured by a screw $q^7$ passing through a slotted ear thereon. It will be perceived that by turning this eccentric the slide may be raised or lowered in relation to the other parts.

Another part of my invention relates to means which prevent the matrices from being engaged by the lifting-slide, except when the latter is fully depressed and in proper position to admit them. This feature is shown in Figs. 26 and 32.

The horizontally-reciprocating fork $s'$, already alluded to as a means of temporarily sustaining the matrices after they are lifted by the slide Q, is operated and timed, as in my previous machine, to advance after the slide is elevated. To a stationary part of the frame I pivot an elbow-lever $s^2$, one end of which is seated loosely in a slot in the slide $s'$, while the opposite end is arranged to vibrate vertically in the path of the horizontal slide O, which pushes the line of matrices forward. During the rise of the lifting-slide Q the slide $s'$ is retracted and the lever $s^2$ permitted to fall, so that if the slide O should advance with a new line of matrices (the previous line being exhausted) while the slide Q is ascending the lever will arrest the motion of the slide O and prevent the matrices from being forced into contact with the lifting-slide Q. When the lifting-slide begins its descent, the slide $s'$, moving forward, will lift the end of the lever $s^2$ and leave the path of the slide O clear, so that it may advance the matrices against the lifting-slide.

It is sometimes desirable to fasten the horizontal slide O in a retracted position, in order that the attendant may have free access to the parts adjacent to the vertical slide. To this end I pivot on the end of the distributer-frame, as in Figs. 1 and 26, a gravity-latch $o^{12}$ to engage and hold a shoulder on the slide when the latter is turned backward beyond its operative position, as in Fig. 26. As this latch is beyond the reach of the operator when seated at the key-board, I mount on a frame a lever $o^{13}$, one end of which rests beneath the latch, while the other is within the reach of the operator, who is thus enabled to disengage the latch without leaving his seat. The lever $o^{13}$ may be omitted.

For the purpose of advancing one line of matrices by the lifting-slide Q, while the follower-slide O is retracted to receive a new line, I employ dogs $o^5$, pivoted to a second horizontal slide $o^6$; but as these parts are constructed and operated as in the former machine, and constitute no part of the present invention, it is deemed unnecessary to describe them in detail.

In order to automatically stop the carrier, by which the matrices are moved along the distributer-rail, in the event of a matrix being displaced or of its becoming lodged between the carrier and the magazine, I propose to employ, as in Patent No. 378,798 and as shown in outline in Fig. 28, an electric stop mechanism, the circuit of which will be closed through the body of the lodged matrix. I therefore employ, as before, a throat-frame X between the distributer-rail and the upper ends of the magazine-tubes, and in this frame I mount a series of vertical laterally-yielding partitions, between which the matrices pass into the tubes. The present improvement in this connection relates, first, to the peculiar manner of forming these yielding partitions, and, second, to the construction of the frame in such manner that it may be readily opened at the front to permit the removal of the lodged matrix. The electric connections and clutching devices may be identical with those in the previous application. The frame is constructed, as shown in Figs. 1, 2, 3, 27, and 28, with a stationary rear plate $x$ and a hinged front plate $x'$, which may be turned upward at will. The internal partitions consist each of a horizontal pin $x^2$, screwed or otherwise fixed firmly into the rear plate and provided with a longitudinal slot receiving the lower edge of a vertical flexible metal plate $x^4$. A second plate $x^5$, doubled or folded upon itself, is slipped over the plate $x^4$ from the upper end and riveted or otherwise secured thereto, its lower edges lying outside of the supporting-screw and serving to guide the descending matrix smoothly past the same. The electric circuit $x^8$, containing the electro-magnet $x^9$, through which the driving-clutch $x^{10}$ is controlled, is connected at one terminal to the throat-frame and at the other to the distributer-rail, either directly or indirectly. When therefore a matrix lodges with one end in contact with the distributer-rail or the carrier and the other end in contact with either of the partitions of the throat-frame, the circuit will be completed, as in my previous application, through the body of the matrix, and thus the carrier brought at once to a stop.

It occasionally occurs that a matrix is delivered to the distributer with the wrong face forward. In order to prevent it from passing into the machine in this position, I provide each matrix in one edge, as shown in Fig. 12, with a transverse notch $o^9$, and provide the distributer-frame on one side with a stationary lip $o^{10}$, as plainly shown in Fig. 32, in position to enter the notch of the matrix, and permit the latter to pass freely thereby in the course of its advance to the lifting-slide Q. If, however, a matrix advances with the wrong face forward, its notch will be on the edge distant from the lip $o^{10}$, so that the solid portion of the matrix will encounter the lip, the effect of which will be to arrest the advance of the matrix and prevent it from moving forward under the influence of the horizontal slide O. It is manifest that the form of the notch and the lip may be varied at will, the only requirement being that one edge of the matrix shall have a form different from the other, and that the machine be provided with an appropriate stop to encounter the matrix.

In practice it is found that unless the matrices in front of the mold are closed tightly together the molten metal will enter between them and form objectionable projections on the linotype. When the matrices are made of flat form on the side faces, foreign substances will occasionally lodge thereon and prevent them from being brought together. To avoid this difficulty and to admit of the entire pressure of the clamps being concentrated on a small surface, I propose to recess each matrix on one or both sides. These recesses or depressions may be made of any suitable form, provided they do not extend to the edges of the matrix in such manner as to interfere with the character therein or to prevent the matrices from assuming parallel positions when locked together. I recommend as the best construction that represented in Fig. 12, in which the matrix is recessed longitudinally on one side, as shown at $o^{11}$. The two vertical edges of the matrix are left unbroken. When a series of matrices thus formed are brought together side by side, it will be seen that they bear at the edges only; that the presence of foreign matters, except upon these edges, is immaterial. In short, the construction admits of the matrices being brought in intimate contact at the edges under the conditions encountered in practice. The notches $o^9$ in the matrices and the pins $o^8$ on the guide also serve, in addition to the purpose heretofore named, that of preventing matrices of one font or of one style from passing accidentally into the machine in connection with matrices of a different font. To this end the matrices of each font will have their notch located in a distinctive position.

Having thus described my invention, what I claim is—

1. The magazine-tube having the longitudinal side opening and the inwardly-turned edges along the sides of said opening.

2. The magazine-tube having the enlarged upper end, the longitudinal side opening, and longitudinal internal ribs or lips terminating below the upper end to permit the free entrance of the matrices.

3. The throat-frame for the magazine, having the series of partitions each composed of a stationary stud, a flexible plate $x^4$, fixed thereto, and an overlying plate $x^5$.

4. The sustaining-frame and the series of independently-removable magazine-tubes engaged therewith, in combination with a locking-bar acting to hold all the tubes in engagement.

5. In combination with the conductor E, into which the matrices are delivered at different points in its length, an air-conductor with openings located at different points in the length of the conductor E and adapted to deliver the air lengthwise of said conductor E, whereby the matrices are subjected to successive impulses of air in the course of their passage.

6. In combination with the trough-like conductor E, the blast-pipe F, discharging therein, and a longitudinal partition $e^4$, extending but a portion of the length of the conductor, and adapted, as described, to divide the ingoing blast.

7. In a composing mechanism, the combination, substantially as shown, of a trough or conductor adapted to admit matrices at different points in its length, a blast mechanism provided with discharge-openings delivering air into and longitudinally of said channel at different points in its length, magazine-tubes located above and at different points in the length of the channel, and ejecting devices whereby the type are delivered from the tubes into the channel.

8. In combination with the inclined conductor E, having a horizontal end to receive the advancing matrices, the internal longitudinal wires or guides $e'$, extended through the inclined portion of the conductor and continued downward over one end of the horizontal portion, whereby the advancing matrices are prevented from jumping out of position as they leave the guide.

9. In combination with the vertically-swinging and laterally-moving arms H H', movable one in relation to the other, and their sustaining-shaft, as described, the connecting-rod $h^4$, attached to one arm and adapted to engage the other, as described and shown.

10. In combination with a guide or conductor E to sustain the matrices, the vertically and laterally movable arm H, provided with the extension-blade $h^2$, adapted to enter the guide or conductor opposite the end of the line of matrices, and the vertically-movable head or yoke I for lowering the matrices past the blade, whereby the matrices are prevented from shifting laterally during their descent.

11. In combination with the vertically-slotted guide or conductor in which the matrices are assembled and supported, the vertically-swinging and laterally-movable arm H, the blade $h^2$, pivoted thereto, and the stationary pin $h^3$, controlling the movement of said blade as it descends.

12. In combination with the guide or conductor, on which the matrices are assembled, the receiving head or yoke I at its end, and the flanged blocks $e^9$, mounted on the conductor, as described, to guide the matrices and keep them in position during their transfer to the yoke.

13. In combination with the rising-and-falling yoke or head I to sustain the line of matrices, the laterally-movable arm H, having the depending blade $h^2$ to act against the rear end of the matrix-line, and an upright arm $j^3$ to act upon the forward end of the matrix-line, whereby the descending line of matrices is properly guided between the blade $h^2$ and arm $j^3$ in descending to the mold.

14. In combination with the head or yoke I for lowering the matrices to the mold, the movable matrix-confining clamp provided with an uprising arm $j^3$ to assist in guiding the line of matrices during its descent.

15. In combination with the main frame, the mold, and the vertically-movable head or yoke I to support the matrices and present them to the mold, a locking device acting to hold the yoke firmly down in place.

16. In combination with the main frame, the mold, the vertically-movable yoke I, and the pivoted dog or hook $i^4$, whereby the yoke is held down in place during the casting operation.

17. In combination with the main frame and the rising-and-falling head I, the rock-shaft $i^3$, the locking-dog, and the arm $i^5$, connected to said shaft, and the vibratory arm $i^2$, connected to the arm $i^5$, whereby it is caused to serve the double purpose of raising and lowering the yoke and of operating the locking device therefor.

18. The combination of the yoke I, the locking-dog mounted thereon and provided with the operating-arm $i^5$, the spring $i^6$, the operating-arm $i^2$, and the yielding link $i'$, connecting the arms $i^2$ and $i^5$.

19. In combination with the mold, the vertically-movable head or yoke I, divided horizontally into two parts, said parts connected to admit of a limited vertical play between them, and the lower part adapted to sustain the matrices, as described.

20. In combination with the mold having a shoulder $j^5$ thereon, the vertically-movable horizontally-divided head or yoke I, its lower member adapted to sustain the matrices and its upper member adapted to bear thereon, and the operating device connected to the upper member, whereby the upper member is caused to effect the accurate alignment of the matrices after they are presented to the mold by the lower member.

21. In combination with the mold, having the shoulder $j^5$, and the main frame, the horizontally-divided vertically-movable yoke or head I, adapted to bear upon the mold and upon the main frame, as described.

22. In combination with a main frame having the vertical shoulder $a^{10}$ to form a bearing therefor, the vertically-movable head I, adapted to sustain the matrices and to bear against their outer or forward edges for substantially their entire height, the horizontally-movable mold adapted to bear against the opposite edges of the matrices, whereby the matrices are firmly confined between the mold and the opposite face of the yoke, and the latter in turn sustained directly by the main frame.

23. The movable matrix yoke or head I, grooved to receive the supporting-shoulders of the matrices with one wall extended downward to support the forward edges of the matrices, but the opposite wall of less vertical width, that the face of the mold may pass thereunder to the edges of the matrices, as shown in Fig. 2.

24. In combination with the mold-wheel and the ejector L, the stationary trimming-blade $w$, having its edge adjacent to the mold, the underlying stationary blade $w'$, having its edge adjacent to the mold-wheel, the stationary blade $w^2$, and the spring-supported plate $w^3$, the two latter lying beneath a stationary surface to guide the type.

25. In a linotype-machine, the linotype-mold having the mold proper $j$, provided in one wall with two or more grooves perpendicular to the front end of the mold and to the face of the type cast therein, whereby the linotypes are formed with raised ribs for spacing or leading purposes.

26. In combination with the rotating mold-wheel movable in the direction of its axis, the main frame provided with a stud adapted to engage said wheel when in its operative position, and thereby hold it against rotation.

27. The sustaining-rails P and the matrices provided with suspending-shoulders to ride on said rails and with notches $o^9$ in one edge, in combination with the slide O and the stud $o^{10}$, whereby the matrices and the slide are arrested in the event of a matrix being reversed.

28. In combination with guides P to support the matrices and the vertical slide Q to lift them singly therefrom, the horizontal slide O for advancing the matrices to the lifting-slide, and the movable stop $s^2$ to arrest the advance of the slide O, and suitable means, substantially as described, for imparting a constant vibration to the stop.

29. In combination with the lifting-slide Q, the constantly-reciprocating slide $s'$ to sustain the matrices when lifted, the stop or dog $s^2$, actuated by the slide $s'$, and the horizontal slide O for advancing the matrices.

30. In combination with the matrix rails or supports in advance of the distributer, the spring-actuated slide O for advancing the matrices thereover, and the latch $o^{12}$ for locking said slide at the will of the operator when retracted.

31. In a mechanism for separating the matrices from the longer space-bars, the reciprocating slide recessed in its upper end to receive and carry the matrices and provided below the recess with the yielding finger to engage the space-bars and carry them downward.

32. In combination with the distributer-rail, the matrix-lifting slide, its operating-pitman Q, their actuating-crank, and the eccentric and adjusting device between the pitman and slide, whereby the rise of the slide may be adjusted in proper relation to the distributing-rail.

33. The matrix having a letter or character in one edge and the longitudinal recess or depression in its side face from end to end.

In testimony whereof I hereunto set my hand, this 3d day of January, 1888, in the presence of two attesting witnesses.

OTTMAR MERGENTHALER.

Witnesses:
ARTES H. EHRMAN,
HARRY G. LELAND.